(12) United States Patent
Nakamura et al.

(10) Patent No.: US 12,451,515 B2
(45) Date of Patent: Oct. 21, 2025

(54) SOLID ELECTROLYTE LAYER AND ALL-SOLID-STATE BATTERY USING SAME

(71) Applicant: TDK CORPORATION, Tokyo (JP)

(72) Inventors: Tomoko Nakamura, Tokyo (JP); Hisashi Suzuki, Tokyo (JP); Keiko Takeuchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 613 days.

(21) Appl. No.: 17/775,624

(22) PCT Filed: Nov. 11, 2020

(86) PCT No.: PCT/JP2020/042034
§ 371 (c)(1),
(2) Date: May 10, 2022

(87) PCT Pub. No.: WO2021/095757
PCT Pub. Date: May 20, 2021

(65) Prior Publication Data
US 2022/0399568 A1    Dec. 15, 2022

(30) Foreign Application Priority Data

Nov. 12, 2019 (JP) ................................ 2019-204386

(51) Int. Cl.
*H01M 10/0562* (2010.01)
*H01M 4/04* (2006.01)
*H01M 10/0525* (2010.01)

(52) U.S. Cl.
CPC ..... *H01M 10/0562* (2013.01); *H01M 4/0407* (2013.01); *H01M 10/0525* (2013.01); *H01M 2300/0068* (2013.01)

(58) Field of Classification Search
CPC ....................... H01M 10/0562; H01M 4/0407
See application file for complete search history.

(56) References Cited

U.S. PATENT DOCUMENTS

| 2007/0175020 | A1  | 8/2007  | Nagata et al. | |
| 2020/0083567 | A1* | 3/2020  | Tomizawa | H01M 10/0562 |
| 2020/0350628 | A1* | 11/2020 | Isojima | H01M 4/131 |

FOREIGN PATENT DOCUMENTS

| JP | 2000-311708 A  |   | 11/2000 |
| JP | 2001-126740 A  |   | 5/2001  |
| JP | 2007-227362 A  |   | 9/2007  |
| JP | 2009283344 A   | * | 12/2009 |
| JP | 2014-192041 A  |   | 10/2014 |
| JP | 2015-060737 A  |   | 3/2015  |
| JP | 2016-207540 A  |   | 12/2016 |
| JP | 2017-157362 A  |   | 9/2017  |

(Continued)

OTHER PUBLICATIONS

English language Machine translation of JP2009283344A (Year: 2009).*

(Continued)

*Primary Examiner* — Jonathan G Jelsma
(74) *Attorney, Agent, or Firm* — Oliff PLC

(57) ABSTRACT

A solid electrolyte layer having a solid electrolyte and carbon, in which a dispersion degree (CV value) of the carbon measured by a quadrat method in a cross section of the solid electrolyte layer is more than zero and less than one.

8 Claims, 3 Drawing Sheets

(56) References Cited

FOREIGN PATENT DOCUMENTS

JP        2018-166020 A    10/2018
WO    2018/025594 A1    2/2018

OTHER PUBLICATIONS

Jan. 19, 2021 International Search Report issued in International Patent Application No. PCT/JP2020/042034.
Jun. 10, 2023 English Translation of the Office Action issued in Chinese Patent Application No. 202080078076.X.

\* cited by examiner

SOLID ELECTROLYTE LAYER AND ALL-SOLID-STATE BATTERY USING SAME

TECHNICAL FIELD

The present invention relates to a solid electrolyte layer and an all-solid-state battery using the same.

Priority is claimed on Japanese Patent Application No. 2019-204386, filed in Japan on Nov. 12, 2019, the content of which is incorporated herein by reference.

BACKGROUND ART

In recent years, electronics technology has been significantly developed, and the size reduction, weight reduction, thickness reduction and multi-functionalization of mobile electronic devices have been achieved. Accordingly, for batteries that serve as power sources of electronic devices, there has been a strong demand for size reduction, weight reduction, thickness reduction and reliability improvement. At the moment, electrolytes (electrolytic solutions) such as organic solvents have been thus far in use as media for ion migration in lithium ion secondary batteries that are being versatilely used. However, in lithium ion secondary batteries having a conventional configuration, electrolytic solutions containing a flammable substance such as an organic solvent are being used, and there is a need to pay attention to prevent the leakage of electrolytic solutions. This creates a demand for a safer lithium ion secondary battery.

Therefore, as one of measures for enhancing the safety of lithium ion secondary batteries, the use of solid electrolytes instead of electrolytic solutions as the electrolytes has been proposed. Furthermore, development of all-solid-state batteries in which a solid electrolyte is used as an electrolyte and all of the other configuration elements are also solid is underway.

However, in a case where all of the integrated configuration elements of a lithium ion secondary battery are solid, when individual layers such as positive electrode layer, an electrolyte layer and a negative electrode layer expand/shrink at different rates during charging and discharging, a tensile/compressive stress is applied between adjacent layers, and cracks are likely to be initiated. Internal cracks increase resistance and increase a dead area, which is incapable of contributing to charging and discharging, which results in a decrease in battery capacities.

Patent Document 1 describes an all-solid-state lithium battery including an oriented positive electrode plate that is composed of an oriented sintered body and is 30 μm or more in thickness. In Patent Document 1, in order to prevent an electrical short circuit or an increase in resistance caused by the generation of cracks or the like, the oriented sintered body includes a plurality of primary particles composed of a lithium composite oxide having a bedded salt structure, and the plurality of primary particles is oriented at an average orientation angle of more than 0° and 30° or less with respect to the plate surface of the oriented positive electrode plate.

Patent Document 2 describes an all-solid-state lithium ion battery having a solid electrolyte film, in which the standard deviation of the thickness of the solid electrolyte film containing a lithium ion-conductive inorganic solid electrolyte material as a main component is 5.0 μm or less. Patent Document 2 describes that the uniformity of the thickness of the solid electrolyte film is controlled to suppress cracks and produce an all-solid-state lithium ion battery having excellent battery characteristics.

Patent Document 3 describes a method in which a resin removal accelerator is added to an unfired body of a solid electrolyte layer and the unfired body is fired to accelerate the removal of a resin in an all-solid-state battery. As an ordinary method for manufacturing an all-solid-state battery, there is a method in which active materials and a solid electrolyte are each dispersed in a solution containing a binder and a plasticizer to produce slurries, active material green sheets and a solid electrolyte green sheet are obtained by forming these slurries and laminated, the binder and the plasticizer are thermally decomposed and removed, and then the laminate is fired, thereby obtaining a laminate of an all-solid-state battery. In Patent Document 3, in a case where resins such as the binder and the plasticizer are not sufficiently removed from the laminate of the all-solid-state battery obtained by firing, carbon or a carbide, which is a residue of the resins, creates electron conductivity, and there is a concern that an internal short circuit may be caused between a positive electrode layer and a negative electrode layer through a solid electrolyte layer. In order to prevent this, in Patent Document 3, the resin removal accelerator is added at least to the unfired body of the solid electrolyte layer and the unfired body is fired.

As described in Patent Document 3, in the related art, the amount of carbon or a carbide in a solid electrolyte layer that configures an all-solid-state battery is preferably extremely small in order to prevent an internal short circuit. However, in order for an internal short circuit to occur, the formation of a conductive path is required, and thus the presence of residual carbon does not always cause an internal short circuit.

CITATION LIST

Patent Literature

[Patent Document 1]
  PCT International Publication No. WO 2018/025594
[Patent Document 2]
  Japanese Patent Laid-Open No. 2017-157362
[Patent Document 3]
  Japanese Patent Laid-Open No. 2015-60737

SUMMARY OF INVENTION

Technical Problem

Even when the expansion rate is decreased by orienting the positive electrode as described in Patent Document 1, the positive electrode is not the only one that expands and shrinks by charging and discharging, and it is considered that the negative electrode, which transfers and emits lithium ions, also significantly expands and shrinks. The expansion and shrinkage of the positive electrode and the negative electrode applies a stress to the electrolyte layer sandwiched between the positive electrode and the negative electrode. When the stress strongly acts, cracks arise and propagate in the all-solid-state battery. Since cracks hinder ion conduction, the resistance increases, and the battery capacity decreases. Therefore, in the invention described in Patent Document 1, the cycle characteristics deteriorate. In addition, even when expansion and shrinkage are made constant as in Patent Document 2, this does not make any difference in the fact that the positive electrode and the negative electrode expand/shrink and a tensile/compressive stress is applied to the adjacent solid electrolyte layer. Therefore, it is assumed that, with the techniques described in Patent Documents 1 and 2, it is difficult to sufficiently suppress the initiation of internal cracks in all-solid-state batteries. Therefore, even in the invention described in Patent Document 2, the cycle characteristics deteriorate.

The present invention has been made in order to solve the above-described problem, and an objective of the present invention is to provide a solid electrolyte layer having excellent cycle characteristics and an all-solid-state battery using the same.

Solution to Problem

A solid electrolyte layer in an all-solid-state battery according to a first aspect of the present invention is a solid electrolyte layer that is a layer having a solid electrolyte and carbon, in which a dispersion degree (CV value) of carbon measured by a quadrat method is more than zero and less than one.

Furthermore, in the solid electrolyte layer according to the above-described aspect, an amount of carbon may be 0.01 to 1.8 vol %.

Furthermore, in the solid electrolyte layer according to the above-described aspect, when an intensity of a G band peak derived from a graphite structure present near 1580 $cm^{-1}$ is represented by IG, an intensity of a D band peak derived from distortion of a graphite structure present near 1350 $cm^{-1}$ is represented by ID, and a ratio therebetween is defined as a graphitization degree (IG/ID) at the time of measuring carbon by Raman spectroscopy with an argon laser, an IG/ID value may be 0.0 or more and 4.0 or less.

Furthermore, in the solid electrolyte layer according to the above-described aspect, an average particle diameter of the carbon particles may be 0.01 μm or more and 1 μm or less.

Furthermore, in the solid electrolyte layer according to the above-described aspect, the carbon particles may be diamond or amorphous carbon particles.

An all-solid-state battery of a second aspect of the present invention has the solid electrolyte layer according to the above-described aspect.

The all-solid-state battery according to the above-described aspect is an all-solid-state battery including a positive electrode layer, a negative electrode layer, a solid electrolyte layer positioned between the positive electrode layer and the negative electrode layer and a margin layer disposed at an outer circumference of each of the positive electrode layer and the negative electrode layer side by side, in which the margin layer may have a solid electrolyte and carbon, and a dispersion degree (CV value) of the carbon measured by a quadrat method in a cross section of the margin layer may be more than zero and less than one.

Advantageous Effects of Invention

According to the present invention, a solid electrolyte layer having excellent cycle characteristics and an all-solid-state battery using the same can be provided.

DESCRIPTION OF EMBODIMENTS

Figure 1:
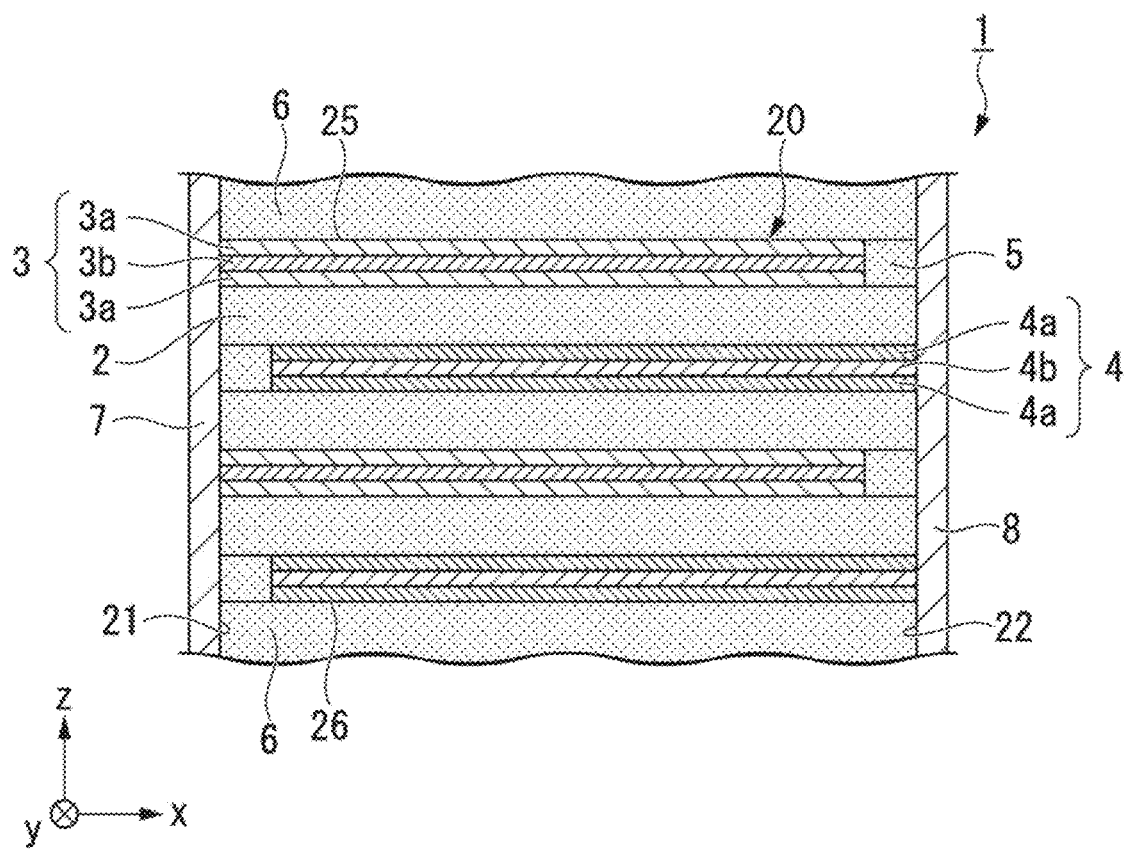
FIG. 1 is an image cross-sectional view showing the configuration of an all-solid-state battery according to an embodiment of the present invention.

Hereinafter, a solid electrolyte layer of the present invention and an all-solid-state battery using the same will be described in detail with reference to the drawings. In the drawings to be used in the following description, there is a case where a characteristic portion is shown in an enlarged manner for convenience in order to facilitate the understanding of the characteristics of the present invention. Therefore, the dimensional ratio and the like of each configuration element shown in the drawings are different from actual ones in some cases. Exemplary materials, a dimensions, and the like to be provided in the following description are simply examples, and the present invention is not limited thereto and can be appropriately modified and carried out within the scope of the gist of the present invention.

First, directions will be defined. A direction in which a positive electrode layer 3 and a negative electrode layer 4, which will be described below, are laminated is defined as a z direction. In addition, one direction of in-plane directions in which the positive electrode layer 3 and the negative electrode layer 4, which will be described below, spread is defined as an x direction, and a direction orthogonal to the x direction is defined as an y direction.

(All-Solid-State Battery)

First, an all-solid-state battery according to the present embodiment will be described.

As in FIG. 1 showing a main portion in an enlarged manner, an all-solid-state battery 1 has a laminate 20 and external layers (cover layers) 6 positioned on both sides of the laminate 20 in the lamination direction. The laminate 20 has the positive electrode layers 3 and the negative electrode layers 4 alternately laminated through solid electrolyte layers 2. The positive electrode layer 3 is an example of a first electrode layer, and the negative electrode layer 4 is an example of a second electrode layer. Any one of the first electrode layer and the second electrode layer functions as a positive electrode, and the other functions as a negative electrode. The positive electrode layer 3 has positive electrode active material layers 3a and a positive electrode current collector layer 3b. The negative electrode layer 4 has negative electrode active material layers 4a and a negative electrode current collector layer 4b. A margin layer 5 is formed so as to form the same plane with each of the positive electrode layer 3 and the negative electrode layer 4. The laminate 20 is a hexahedron and has two end faces (a first end face 21 and a second end face 22) and two side surfaces (a first side surface and a second side surface) formed as surfaces parallel to the lamination direction, and an upper surface 25 and a lower surface 26 formed as surfaces orthogonal to the lamination direction. The positive electrode current collector layers 31 are exposed on the first end face 21, and the negative electrode current collector layers 42 are exposed on the second end face 22. The first side surface is a side surface on the right side when seen from the first end face 21 side with the upper surface 25 positioned above, and the second side surface is a side surface on the left side when seen from the first end face 21 side with the upper surface 25 positioned above. In addition, the first end face 21 and the second end face 22 are opposite to each other, and the first side surface and the second side surface are opposite to each other.

An outer positive electrode 7 that is electrically connected to the positive electrode current collector layers 3b is provided so as to cover the first end face 21 side of the laminate 20. This electrical connection is achieved by connecting the outer positive electrode 7 to the positive electrode current collector layers 31 of the positive electrode 30 exposed on the first end face 21 of the laminate 20.

An outer negative electrode 8 that is electrically connected to the negative electrode current collector layers 4b is provided so as to cover the second end face 22 side of the laminate 20. This electrical connection is achieved by connecting the outer negative electrode 70 to the negative electrode current collector layers 41 of the negative electrode 40 exposed on the second end face 22 of the laminate 20.

In the following descriptions in the specification, any one or both of a positive electrode active material and a negative electrode active material will be referred to as the active material as a collective term, any one or both of the positive electrode active material layer 3a and the negative electrode active material layer 4a will be collectively referred to as the active material layer, any one or both of the positive electrode current collector layer 3b and the negative electrode current collector layer 4b will be collectively referred to as the current collector layer, any one or both of the positive electrode layer 3 and the negative electrode layer 4 will be collectively referred to as the electrode layer, the first end face 21 and the second end face 22 will be collectively referred to as the end face, the first side surface and the second side surface will be referred to as the side surface, and the outer positive electrode 7 and the outer negative electrode 8 will be collectively referred to as the outer electrode.

The margin layers 5 in the all-solid-state battery 1 of the present embodiment are preferably provided to eliminate the length difference between the solid electrolyte layer 2 and the positive electrode layer 3 and the length difference between the solid electrolyte layer 2 and the negative electrode layer 4 in a case where the length differences are large. The margin layers 5 are preferably provided in the same plane as the positive electrode layer 3 and the negative electrode layer 4. The margin layer 5 may be made from the solid electrolyte which is identical to or different from the solid electrolyte that is contained in the solid electrolyte layer 2 to be described below. Since the presence of the margin layers 5 eliminates the length differences between the solid electrolyte layer 2 and the positive electrode layer 3 and between the solid electrolyte layer 2 and the negative electrode layer 4, the denseness between the solid electrolyte layer 2 and the electrode layer becomes high, and interlayer peeling (delamination) or warpage caused by the firing of the all-solid-state battery is less likely to occur. The margin layers 5 are formed in regions other than the positive electrode layers 3 and the negative electrode layers 4 on the main surfaces of the solid electrolyte layers 2 in substantially the same height as the positive electrode layer 3 or the negative electrode layer 4 (that is, such that the margin layers 5 are disposed at the outer circumferences of the positive electrode layers 3 and the negative electrode layers 4, respectively, side by side).

(Solid Electrolyte Layer)

The solid electrolyte layer 2 according to the present embodiment has a solid electrolyte and carbon, and, in a cross section of the solid electrolyte layer, the dispersion degree (CV value) of carbon measured by the quadrat method is more than zero and less than one.

According to such a configuration, the solid electrolyte layer 2 has an excellent strength as a whole due to particle dispersion strengthening, which will be described below. Therefore, even when a stress attributed to the volume expansion and shrinkage of the positive electrode active material and the negative electrode active material associated with charging and discharging reactions is applied, cracks are less likely to be initiated in the solid electrolyte layer. As a result, excellent cycle characteristics can be obtained.

In addition, carbon does not only have an excellent mechanical strength, but is also an abundant element, relatively inexpensive, and almost harmless as a simple carbon substance and is thus excellent as an additive to the solid electrolyte layer.

On the other hand, ordinarily, carbon has high electron conductivity, and thus an internal short circuit is likely to occur when carbon is continuously present. However, in the solid electrolyte layer 2, the dispersion degree of carbon measured by the quadrat method is less than one, and the number of carbon atoms connected is small, and thus a conductive path is not formed, and an internal short circuit is suppressed.

Figure 2:
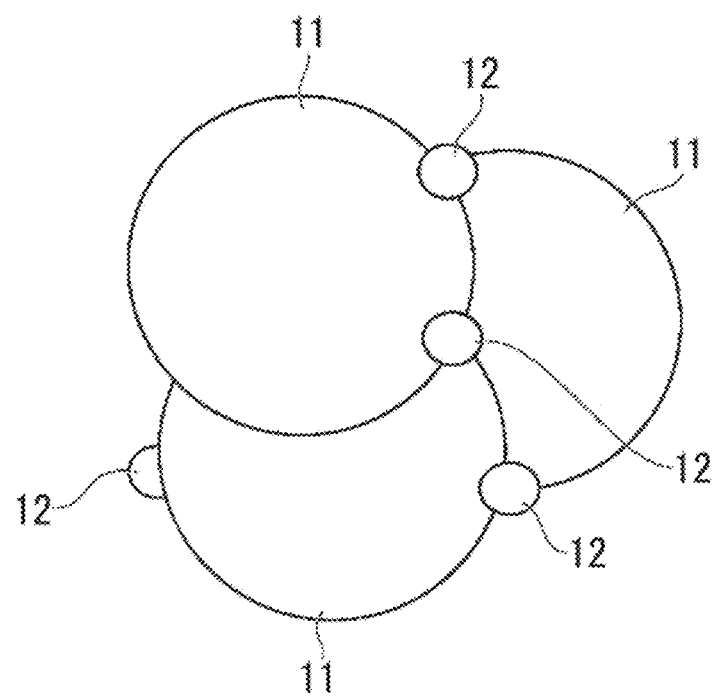
FIG. 2 is an image view of a solid electrolyte and carbon in a solid electrolyte layer according to the embodiment of the present invention.

As shown in FIG. 2, the solid electrolyte layer 2 of the present embodiment has a plurality of solid electrolyte particles 11 and carbon particles 12 dispersed between the plurality of solid electrolyte particles 11. FIG. 2 is a schematic view showing an example of the internal structure of the solid electrolyte layer 2.

The solid electrolyte layer 2 contains the carbon particles 12 between the plurality of solid electrolyte particles 11, which improves the mechanical strength, such as fracture toughness, of the entire solid electrolyte layer 2 due to particle dispersion strengthening. This is because the carbon particles 12 have an excellent mechanical strength. Therefore, even when a stress attributed to the volume expansion and shrinkage of the positive electrode active material and the negative electrode active material associated with discharging reactions is applied, cracks are less likely to arise in the solid electrolyte layer 2. As a result, excellent cycle characteristics can be obtained in the all-solid-state battery 1 using this solid electrolyte layer.

The effect of the carbon particles 12 on improvement in the mechanical strength of the solid electrolyte layer 2 differs with the graphitization degree. When having a high strength, the carbon particles 12 have a strong effect on pinning the propagation of cracks. In a case where diamond or amorphous carbon particles are used as the carbon particles 12, since the strength of diamond or amorphous carbon particles is high, the strength of the entire solid electrolyte layer 2 improves. Therefore, the all-solid-state battery 1 is capable of obtaining excellent cycle characteristics.

The average particle diameter of the carbon particles 12 is preferably 0.01 to 1 μm. 0.01 μm or smaller carbon powder is difficult to disperse and likely to form aggregates, and the carbon particles 12 larger than 1 μm are too large compared with the solid electrolyte powder, and thus, when the average particle diameter of the carbon particles 12 is set to 0.01 to 1 μm, it is easy to uniformly disperse the carbon particles, the mechanical strength of the solid electrolyte layer 2 improves, and consequently, the cycle characteristics improve.

In the solid electrolyte layer 2 of the present embodiment, the CV value is preferably less than 1.0 when the dispersion degree of the carbon particles 12 having particle diameters of 0.01 to 1 μm is obtained by the quadrat method.

In the present embodiment, the CV value is used as an index showing that the carbon particles 12 are uniformly present. That is, when the CV value is low, since the carbon particles 12 are uniformly present, the effect on improvement in the strength of the entire solid electrolyte layer 2 is strong, and the cycle characteristics improve. Furthermore, in a case where the CV value is low, the probability of the carbon particles 12 being continuously present is low, and a short circuit failure can be suppressed.

On the other hand, in a case where the CV value is high, that is, the carbon particles 12 are not uniformly present, the probability of the carbon particles 12 being continuously present is high, and there is a high possibility that a short circuit failure may occur. Incidentally, regions where the carbon particles 12 are not present increase, and the strength of the entire solid electrolyte layer cannot be significantly improved.

Figure 3:
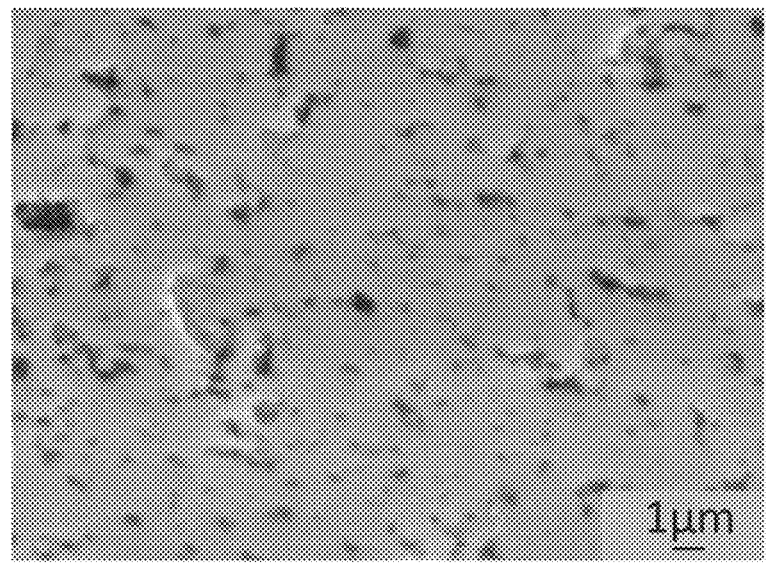
FIG. 3 is a SEM image (backscattered electron image) of the solid electrolyte layer according to the embodiment of the present invention.
Figure 4:
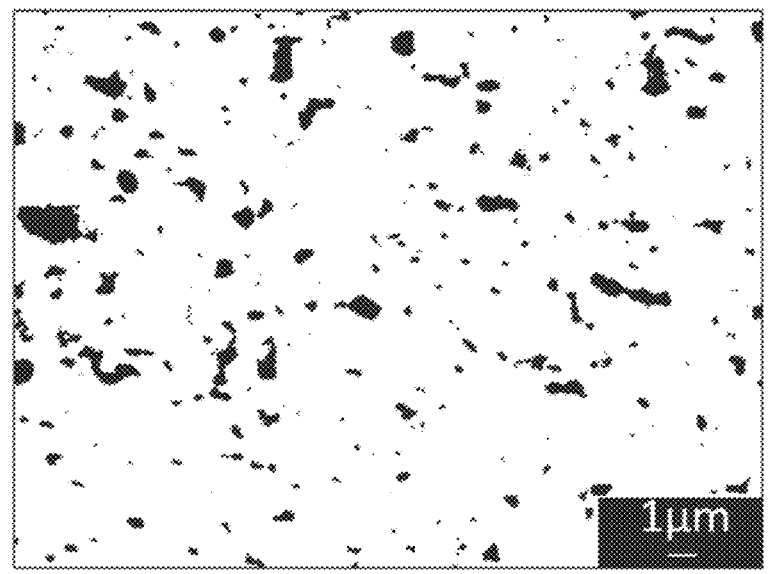
FIG. 4 is a binarized image of the SEM image (backscattered electron image) of the solid electrolyte layer according to the embodiment of the present invention.
Figure 5:
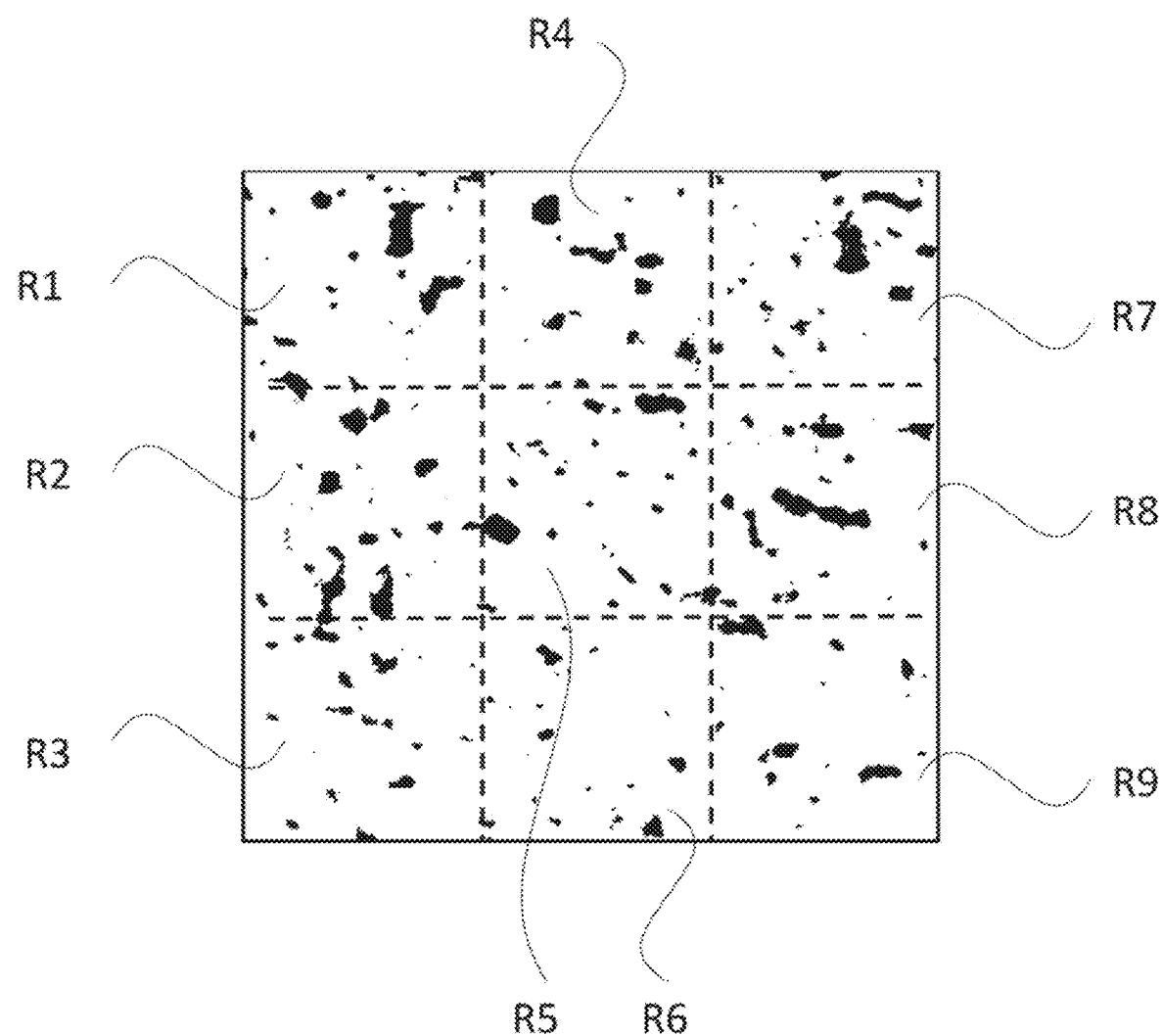
FIG. 5 is a view of a part of the binarized image of the solid electrolyte layer according to the embodiment of the present invention divided into nine squares.

Here, an example of a backscattered electron image of a scanning electron microscope (SEM) showing the solid electrolyte layer 2 is shown in FIG. 3. In addition, an image obtained by binarizing the image of FIG. 3 with image analysis software is shown in FIG. 4. In addition, an image obtained by cutting out a square portion from the image shown in FIG. 4 and further dividing the cut-out square portion into nine squares is shown in FIG. 5.

In the present embodiment, a cross section including the interface between the solid electrolyte layer 2 and the positive electrode active material layer 3a and the interface between the solid electrolyte layer 2 and the negative electrode active material layer 4a is cut out and then polished, and a SEM image as shown in FIG. 3 is obtained with a scanning electron microscope (SEM) from the polished surface. In addition, the image showing the solid electrolyte layer 2 is not limited to the SEM image, and a TEM image may be obtained with a transmission electron microscope (TEM). FIG. 3 shows a portion where a particularly large amount of carbon is present in an enlarged manner for convenience of description, but the solid electrolyte layer 2 according to the present embodiment is not limited to this example.

In the SEM image shown in FIG. 3, the phase (main phase) of the solid electrolyte particle 11 is identified as "bright color", and the phase (sub phase) of the carbon particle 12 is identified as "dark color".

In the present embodiment, the dispersion degree of the carbon particles 12 having particle diameters of 0.01 to 1 μm is obtained by the quadrat method using image analysis software.

Specifically, first, the above-described SEM image is binarized by image processing. Regarding the binarization treatment of the SEM image, a concentration histogram is produced by a mode method from the SEM image. In the concentration histogram, the concentration value at a valley corresponding to the boundary between the main phase and the sub phase is defined as the threshold value, regions that become the main phases with the threshold value interposed therebetween are defined as "bright portions", and regions that become the sub phases with the threshold value interposed therebetween are defined as "dark portions".

In concentration histograms, in many cases, a bimodal histogram having two crests with one valley interposed therebetween is obtained, but there is also a case where two or more valleys are formed. In this case, a valley corresponding to the boundary between the main phase and the sub phase is selected, and the concentration value at the valley may be defined as the threshold value.

Next, an image obtained by binarizing the SEM image is shown in FIG. 4. The image shown in FIG. 4 is evenly partitioned into a plurality of regions, and the number of the carbon particles 12 having particle diameters of 0.01 μm or more that are present in each region is counted.

In the present embodiment, the image is partitioned into nine square regions as shown in FIG. 5. Hereinafter, the nine square regions will be referred to as regions R1 to R9, respectively. The numbers of the carbon particles 12 having particle diameters of 0.01 μm or more that were present in the regions R1 to R9 shown in FIG. 5 were counted. The results are shown in Table 1 below.

TABLE 1

| Region | 1 | 2 | 3 | 4 | 5 | 6 | 7 | 8 | 9 | Total | Average | Standard deviation | CV value |
|---|---|---|---|---|---|---|---|---|---|---|---|---|---|
| Number | 15 | 10 | 8 | 18 | 11 | 16 | 8 | 6 | 7 | 99 | 11.0 | 4.3 | 0 4 |

Next, the average value and standard deviation value of the numbers of the carbon particles 12 counted in the regions R1 to R9 are obtained, and the CV value (=the standard deviation value÷the average value) is calculated. As a result, as shown in Table 1, the average value was 11.1, the standard deviation value was 4.5, and the CV value (=(the standard deviation value)/(the average value)) was 0.4.

In the solid electrolyte layer 2 of the present embodiment, when the above-described CV value becomes 1.0 or less, the strength of the solid electrolyte layer 2 improves due to particle dispersion strengthening. Therefore, the fracture of the solid electrolyte layer 2 caused by the expansion and shrinkage stress during charging and discharging can be suppressed and the cycle characteristics of the all-solid-state battery 1 can be improved.

On the other hand, when the above-described CV value becomes 1.0 or more as shown in Table 2 below, for example, at the time of distribution as shown in Table 2 below, the carbon particles 12 dispersed between the solid electrolyte particles 11 are segregated, and the effect on improvement in the strength of the entire solid electrolyte layer 2 becomes insufficient. In this case, it is difficult to prevent fracture in the vicinities of the interface between the solid electrolyte layer 2 and the positive electrode active material layer 3a and the interface between the solid electrolyte layer 2 and the negative electrode active material layer 4a during charging and discharging. That is, when the above-described CV value is 1.0 or more, it is difficult to improve the cycle characteristics of the all-solid-state battery. In addition, the segregated carbon particles 12 are likely to form a conductive path. In this case, a short circuit failure occurs from the first time. The solid electrolyte layer 2 of the present embodiment preferably contains no carbon particles having particle diameters of 1 μm or more.

TABLE 2

| Region | 1 | 2 | 3 | 4 | 5 | 6 | 7 | 8 | 9 | Total | Average | Standard deviation | CV value |
|---|---|---|---|---|---|---|---|---|---|---|---|---|---|
| Number | 19 | 7 | 2 | 52 | 16 | 8 | 5 | 1 | 3 | 93 | 10.3 | 10.2 | 1.0 |

Furthermore, in the solid electrolyte layer 2, the amount of carbon is preferably 0.01 to 1.8 vol %. The amount (vol %) of carbon can be obtained in terms of, for example, volume for which the specific gravity of carbon is used. Specifically, the volume converted from the amount (vol %) of carbon based on the specific gravity can be obtained from {(the amount (wt %) of carbon in the solid electrolyte layer)/the specific gravity (g/cm$^3$) of carbon}/{(the amount (wt %) of carbon in the solid electrolyte layer)/the specific gravity (g/cm$^3$) of carbon}+{(the amount (wt %) of the solid electrolyte in the solid electrolyte layer)/the specific gravity (g/cm$^3$) of the solid electrolyte}. The amount (wt %) of carbon in the solid electrolyte layer 2 can be measured by, for example, a method in which an electron probe microanalyzer (EPMA (WDS=wavelength dispersive spectroscopy)) is used or a method in which the portion of the solid electrolyte layer is separated and collected and a carbon/sulfur analyzer (manufactured by LECO Japan Corporation, CS-844 (or a device to which the same principle is applied)) is used.

In a case where the amount of carbon in the solid electrolyte layer in the all-solid-state battery is analyzed with the carbon/sulfur analyzer, an extremely large number of all-solid-state battery samples and an extremely large amount of expense is required to separate and collect only the solid electrolyte layer from a laminated fired product of the all-solid-state battery. Therefore, a sample in which only the solid electrolyte is laminated may be prepared as a model sample, fired at the same time, and used to substitute the laminated fired product of the all-solid-state battery in the analysis of the amount of carbon.

When the amount of the carbon particles 12 is 0.01 vol % or more, a strong effect on strength improvement can be obtained. In addition, when the amount of the carbon particles 12 is set to 1.8 vol % or less, the firing of the all-solid-state battery can be facilitated, and high initial characteristics can be obtained.

Additionally, in the solid electrolyte layer 2, the amount of the carbon particles 12 is more preferably 0.02 to 0.8 vol %.

Furthermore, in the solid electrolyte layer 2, when the intensity of a G band peak derived from the graphite structure present near 1580 cm$^{-1}$ is represented by IG, the intensity of a D band peak derived from distortion of the graphite structure present near 1350 cm$^{-1}$ is represented by ID, and the ratio therebetween is defined as the graphitization degree (IG/ID) at the time of measuring the carbon particles 12 by Raman spectroscopy with an argon laser, the IG/ID value is preferably 0.0 or more and 4.0 or less. Here, in the present embodiment, the preferable range of the IG/ID value also includes 0.0.

Ordinarily, the Raman spectrum of a carbon material has two characteristic peaks of a G band peak that appears near 1580 cm$^{-1}$ and a D band peak that appears near 1350 cm$^{-1}$. The G band peak is a peak attributed to the vibrations of carbon atoms in the hexagonal grid in the graphite structure, and the D band peak is a peak attributed to carbon atoms having a dangling bond such as amorphous carbon. When the crystallinity of the carbon material increases, the intensity of the G band peak increases, and, when the crystallinity decreases (the carbon material becomes amorphous), the intensity of the D band peak increases.

Since a carbon material having an IG/ID value of 0.0 is a diamond crystal and a carbon material having an IG/ID value of more than 0.0 and 4.0 or less is amorphous carbon, the mechanical strength of carbon itself is high. Therefore, when these carbons are contained, an effect on increasing the strength of the solid electrolyte layer is strong.

In the present embodiment, the Raman spectrum of the carbon particles 12 that are contained in the solid electrolyte layer 2 is measured as described below.

First, the all-solid-state battery 1 is polished almost perpendicularly to the lamination direction of the solid electrolyte layer 2 in a state of being embedded in a resin such as an epoxy resin, and a cross section of the solid electrolyte layer 2 is exposed. Next, the cross section is observed, a portion where a number of the carbon particles 12 are present in a diameter of 1 μm is selected, and Raman spectroscopy is carried out using an argon laser having a beam diameter of approximately 1 μm.

Raman spectroscopy can be carried out using, for example, NRS-7100 manufactured by JASCO Corporation. The intensity (IG) of the G band peak and the intensity (ID) of the D band peak of each carbon particle 12 are measured, and the ratio therebetween is defined as the graphitization degree (IG/ID).

The solid electrolyte layer 2 of the present embodiment contains a solid electrolyte. As the solid electrolyte, for example, at least one selected from lithium aluminum titanium phosphate $Li_{1+x}Al_xTi_{2-x}(PO_4)_3$ (0≤x≤0.6), lithium germanium phosphate $Li_{1-x}Al_xGe_{2-x}(PO_4)_3$ (0≤x≤0.6), $Li_{3+x1}Si_{x1}P_{1-x1}O_4$ (0.4≤x1≤0.6), $Li_{3.4}V_{0.4}Ge_{0.6}O_4$, $Li_2OV_2O_5$—$SiO_2$, $Li_2O$—$P_2O_5$—$B_2O_3$, $Li_{3x}La_{2/3x}TiO_3$, $Li_{14}Zn(GeO_4)_4$, $Li_7La_3Zr_2O_{12}$ and $LiZr(PO_4)_3$ can be used. The solid electrolyte layer 2 preferably contains, among these, a phosphate such as lithium aluminum titanium phosphate or lithium germanium phosphate. The shape of the solid electrolyte particle 11 does not particularly matter. The shape of the solid electrolyte particle 11 is, for example, a spherical shape, an ellipsoidal shape, a needle shape, a plate shape, a scale shape, a tubular shape, a wire shape, a rod shape or amorphous. The particle diameters of the solid electrolyte particles 11 are, for example, 0.05 μm or more and 50 μm or less and may be 0.1 μm or more and 10 μm or less. The particle diameter of the solid electrolyte particle 11 is obtained from a measurement value (D50) that can be obtained by measuring the particle size distribution. D50 is the diameter of a particle at a cumulative value of 50% in a distribution curve obtained by particle size distribution measurement. The particle size distribution of particles is measured with, for example, a particle size distribution measuring instrument using a laser diffraction and scattering method (Microtrac method).

In addition, some elements of the solid electrolyte particles 11 may be substituted or the compositional ratio may be changed to an extent that the solid electrolyte layer 2 of the present embodiment is capable of carrying out its function.

Furthermore, in the solid electrolyte layer 2 of the present embodiment, a plurality of kinds of solid electrolytes may be used in a mixture form.

(Positive Electrode Active Material and Negative Electrode Active Material)

As described above, either or both of the positive electrode active material layer 3a and the negative electrode active material layer 4a of the all-solid-state battery of the present embodiment contains, for example, lithium vanadium phosphate, lithium vanadium pyrophosphate or the like. Examples of lithium vanadium phosphate include $LiVOPO_4$, $Li_4(VO)(PO_4)_2$, $Li_9V_3(P_2O_7)_3(PO_4)_2$, $Li_xV_2(PO_4)_3(2.9 \leq x \leq 3.5)$ and the like. Examples of lithium vanadium pyrophosphate include $Li_2VOP_2O_7$, $Li_2VP_2O_7$ and the like. The positive electrode active material layer 3a and the negative electrode active material layer 4a preferably contain any one or a plurality of the above-described compositions and particularly preferably contain $Li_3V_2(PO_4)_3$. Furthermore, $Li_3V_2(PO_4)_3$ in the positive electrode active material layer 3a and the negative electrode active material layer 4a is preferably relatively rich in lithium and more preferably $Li_xV_2(PO_4)_3(3.0 < x \leq 3.4)$.

In addition, materials in the positive electrode active material layer 3a and the negative electrode active material layer 4a are preferably exactly the same material. According to such a configuration, since the all-solid-state battery becomes nonpolar, there is no need to designate a direction even when the all-solid-state battery is mounted in a circuit board, and the mountability can be extremely improved, which is advantageous.

The positive electrode active material layer 3a and the negative electrode active material layer 4a may contain a positive electrode active material and a negative electrode active material other than lithium vanadium phosphate and lithium vanadium pyrophosphate. For example, the positive electrode active material layer 3a and the negative electrode active material layer 4a may contain a conductive auxiliary agent, a binding material or the like and preferably contain a transition metal oxide or a transition metal composite oxide. Specifically, the transition metal composite oxide is preferably any of lithium manganese complex oxides $Li_2Mn_{x3}Ma_{1-x3}O_3(0.8 \leq x3 \leq 1$ and Ma=Co or Ni), lithium cobalt oxide ($LiCoO_2$), lithium nickel oxide ($LiNiO_2$), lithium manganese spinel ($LiMn2O_4$), a composite metal oxide represented by a general formula: $LiNi_{x4}Co_{y4}Mn_{z4}O_2$ (x4+y4+z4=1, $0 \leq x4 \leq 1$, $0 \leq y4 \leq 1$ and $0 \leq z4 \leq 1$), a lithium vanadium compound ($LiV_2O_5$), olivine-type $LiMbPO_4$ (here, Mb is one or more elements selected from Co, Ni, Mn, Fe, Mg, Nb, Ti, Al and Zr), a Li-excess solid solution positive electrode $Li_2MnO_3$—$LiMcO_2$ (Mc=Mn, Co or Ni), lithium titanate ($TiO_2$ or $Li_4Ti_5O_{12}$) and a composite metal oxide represented by $LiaNi_{x5}Co_{y5}Al_{15}O_2(0.9 < a < 1.3$ and $0.9 < x5+y5+z5 < 1.1)$. In addition, the amount of these materials is preferably within a range of 1 part by mass to 20 parts by mass with respect to 100 parts by mass of lithium vanadium phosphate in the positive electrode active material layer 3a or the negative electrode active material layer 4a.

Here, there is no clear discrimination between the active materials that configure the positive electrode active material layer 3a and the negative electrode active material layer 4a. Comparing the potentials of two kinds of compounds, that is, a compound in the positive electrode active material layer and a compound in the negative electrode active material layer, a compound exhibiting a higher potential can be used as the positive electrode active material and a compound exhibiting a lower potential can be used as the negative electrode active material. In addition, the same compound may be used in the positive electrode active material layer 3a and the negative electrode active material layer 4a as long as the compound is capable of emitting lithium ions and absorbing lithium ions at the same time.

(Positive Electrode Current Collector and Negative Electrode Current Collector)

As materials that configure the positive electrode current collector layer 3b and the negative electrode current collector layer 4b of the all-solid-state battery of the present embodiment, a material having a high electrical conductivity is preferably used, and, for example, silver, palladium, gold, platinum, aluminum, copper, nickel, or the like is preferably used. Particularly, copper is more preferable since copper does not easily react with the solid electrolyte that is used in the solid electrolyte layer 2 and, furthermore, has an effect on decreasing the internal resistance of the all-solid-state battery 1. The materials that configure the positive electrode current collector layer 3b and the negative electrode current collector layer 4b may be identical to or different from each other.

In addition, the positive electrode current collector layer 3b and the negative electrode current collector layer 4b of the all-solid-state battery 1 of the present embodiment preferably contain a positive electrode active material and a negative electrode active material, respectively.

When the positive electrode current collector layer 3b and the negative electrode current collector layer 4b contain a positive electrode active material and a negative electrode active material, respectively, the adhesiveness between the positive electrode current collector layer 3b and the positive electrode active material layer 3a and the adhesiveness between the negative electrode current collector layer 4b and the negative electrode active material layer 4a improve.

The ratios of the positive electrode active material and the negative electrode active material in the positive electrode current collector layer 3b and the negative electrode current collector layer 4b of the present embodiment are not particularly limited as long as the positive electrode current collector layer 3b and the negative electrode current collector layer 4b function as a current collector, but the volume ratio of the positive electrode current collector to the positive electrode active material or the negative electrode current collector to the negative electrode active material is preferably within a range of 90/10 to 70/30.

(Margin Layer)

The margin layers 5 of the present embodiment are preferably provided to eliminate the length difference between the solid electrolyte layer 2 and the positive electrode layer 3 and the length difference between the solid electrolyte layer 2 and the negative electrode layer 4, and the presence of such margin layers 5 eliminates the length difference between the solid electrolyte layer 2 and the positive electrode layer 3 and the length difference between the solid electrolyte layer 2 and the negative electrode layer 4. Therefore, the adhesiveness at the time of laminating the all-solid-state battery 1 improves, furthermore, a shrinkage stress during firing is relaxed, and interlayer peeling (delamination) or warpage is less likely to occur.

A material that configures the margin layer 5 may be the same material as or a different material from the solid electrolyte layer 2, but preferably contains the same material as the solid electrolyte layer 2. For example, when the solid electrolyte layer 2 of the present embodiment contains lithium aluminum titanium phosphate as the solid electrolyte, the margin layer 5 also preferably contains lithium aluminum titanium phosphate. In addition, a plurality of kinds of solid electrolyte materials may be contained in accordance with the solid electrolyte layer 2. At that time, the margin layer preferably has the same configuration as in the solid electrolyte layer 2.

The margin layer 5 of the present embodiment preferably has the same solid electrolyte as in the solid electrolyte layer 2 of the present embodiment and carbon, and furthermore, the dispersion degree (CV value) of carbon in a cross section of the margin layer 5 is preferably the same as that of the solid electrolyte layer 2. That is, the margin layer 5 and the solid electrolyte layer 2 preferably have the same composition and the same dispersion degree (CV value) of carbon. When the margin layer 5 and the solid electrolyte layer 2 have the same composition and the same dispersion degree, the effect on relaxing a shrinkage stress during firing becomes strong, and interlayer peeling (delamination) or warpage caused by firing is less likely to occur. The dispersion degree (CV value) of carbon in the cross section of the margin layer 5 can be obtained by the same method for the dispersion degree (CV value) of carbon in the cross section of the solid electrolyte layer 2.

(Method for Manufacturing of all-Solid-State Battery)

The all-solid-state battery 1 using the solid electrolyte layer 2 of the present embodiment can be manufactured in the following order. Each material of the solid electrolyte and carbon, the positive electrode active material, the positive electrode current collector, the negative electrode active material, the negative electrode current collector, and the solid electrolyte and carbon for the margin layer is made into a paste.

A method for making the solid electrolyte and carbon into a paste is not particularly limited, but it is preferable that, first, solid electrolyte powder and carbon powder are highly dispersed in advance and then a vehicle is mixed with the highly-dispersed powders, thereby obtaining a paste. Here, in order to highly disperse the solid electrolyte powder and the carbon powder, a device capable of exerting compressive, shearing and impactive forces to the powder particles may be used.

Ordinary mixing and dispersion are carried out by three actions of convection, shearing and diffusion; however, in a case where nanoparticles such as carbon black are used as a raw material, mixing and dispersion are preferably carried out with a device having a function of a grinder overcoming a strong cohesive force (impact, compression, grinding or the like).

The above-described device is not particularly limited as long as the device is capable of efficiently dispersing a carbon material such as carbon black and the solid electrolyte, and MECHANO FUSION and NOBILTA manufactured by Hosokawa Micron Co., Ltd., and THETA COMPOSER manufactured by Tokuju Corporation, a hybridization system manufactured by Nara Machinery Co., Ltd., a DMM mechanochemical device manufactured by K. C. K., a high-speed planetary ball mill manufactured by Kurimoto, Ltd. or the like may be used. It is preferable to select appropriate conditions depending on the device.

For example, in NOBILTA manufactured by Hosokawa Micron Co., Ltd., three forces of compression, shearing and impact are exerted on particles in a well-balanced manner, whereby it is possible to efficiently disperse carbon black powder, which is nanoparticles, and to composite the carbon black powder with the solid electrolyte powder, which is a parent material. In a case where particles have been composited, a highly dispersed state even in the subsequent step such as vehicle mixing can be maintained.

Next, a vehicle is mixed with the highly-dispersed powders to produce a paste. The vehicle is a collective term for media in a liquid phase, and examples thereof include a solvent, a binder and the like. A binder that is contained in pastes for molding a green sheet or a printed layer is not particularly limited, a polyvinyl butyral resin, a polyvinyl acetal resin, a cellulose resin, an acrylic resin, a urethane resin, a vinyl acetate resin and the like can be used, and at least one of these resins is contained.

In addition, the paste may contain a plasticizer. The kind of the plasticizer is not particularly limited, and phthalate esters such as dibutyl phthalate and benzyl butyl phthalate may be used.

By such a method, a paste for the solid electrolyte layer, a paste for the positive electrode active material layer, a paste for the positive electrode current collector layer, a paste for the negative electrode active material layer, a paste for the negative electrode current collector layer and a paste for the margin layer are produced.

A green sheet for the solid electrolyte layer is produced by applying the paste for the solid electrolyte layer produced above onto a base material such as polyethylene terephthalate (PET) in a desired thickness and drying the paste as necessary. A method for producing the green sheet for the solid electrolyte layer is not particularly limited, and a well-known method such as a doctor blade method, a die coater, a comma coater, or a gravure coater can be adopted. Next, the positive electrode active material layer, the positive electrode current collector layer and the positive electrode active material layer are sequentially printed by screen printing and laminated on the green sheet for the solid electrolyte layer to form the positive electrode layer. Furthermore, in order to bury the length difference between the green sheet for the solid electrolyte layer and the positive electrode layer, the margin layer is formed by screen printing in a region other than the positive electrode layer, thereby producing a positive electrode layer unit.

Next, the negative electrode active material layer, the negative electrode current collector layer and the negative electrode active material layer are sequentially printed by screen printing and laminated on the green sheet for the solid electrolyte layer to form the negative electrode layer, and the margin layer is formed by screen printing in a region other than the negative electrode layer to bury the length difference, thereby producing a negative electrode layer unit.

In addition, the positive electrode layer units and the negative electrode layer units are alternately laminated to be offset such that one end of the positive electrode layer unit and one end of the negative electrode layer unit do not match each other, and furthermore, external layers (cover layers) 6 on both main surfaces of the laminated body can be provided as necessary. When the external layers 6 are laminated, a laminate substrate in which a plurality of elements of the all-solid-state battery is included is produced. For the external layers 6, the same solid electrolyte can be used as for the solid electrolyte layer 2 and carbon, and the green sheet for the solid electrolyte layer can be used. In a case where the same green sheet is used, the shrinkage behavior in the firing process becomes almost the same as that of the solid electrolyte layer 2, which is an inner layer, and a defect caused by a difference in shrinkage stress during firing is less likely to occur.

The manufacturing method according to the present embodiment is designed to produce a parallel-type all-solid-state battery, and, in a method for manufacturing a serial-type all-solid-state battery, the positive electrode layer unit and the negative electrode layer unit may be laminated such that one end of the positive electrode layer and one end of the negative electrode layer match each other, that is, are not offset.

Furthermore, adhesiveness can be enhanced by collectively pressurizing the produced laminate substrates by metal mold pressing, warm isostatic pressing (WIP), cold isostatic pressing (CIP), isostatic pressing, or the like. The laminate substrates are preferably pressurized while being heated and can be pressurized at, for example, 40° C. to 95° C.

The produced laminate substrate can be cut into an unfired laminate of an all-solid-state battery using a dicing device or the like.

Next, the binder is removed from the unfired laminate, and the unfired laminate is fired. For example, the unfired laminate is heated to 500° C. to 750° C. in a nitrogen atmosphere to remove the binder. The binder removal time is set to, for example, one to 20 hours. After that, the unfired laminate is heated to 600° C. to 1000° C. in a nitrogen atmosphere and fired, whereby a fired laminate can be obtained. The firing time is set to, for example, 0.1 to 3 hours.

The fired laminate may be put into a cylindrical container together with an abrasive such as alumina ($Al_2O_3$) and barrel-polished. In this way, the corners of the entire laminate can be chamfered. In addition, as a different polishing method, sandblasting may be used for the polishing. In this polishing method, it is possible to shave off only a specific portion of the laminate, which is preferable.

Furthermore, in order to efficiently extract a current from the fired laminate, the outer electrodes 7 and 8 can be provided. The outer electrodes 7 and 8 are each connected to one end of the positive electrode layer 3 extending toward one side surface of the laminate 20 and one end of the negative electrode layer 4 extending toward one side surface of the laminate 20. Therefore, a pair of the outer electrodes 7 and 8 is formed so as to clamp one side surface of the laminate 20. Examples of a method for forming the outer electrodes 7 and 8 include a sputtering method, a screen-printing method, a dip coating method, and the like. In the screen-printing method and the dip coating method, pastes for the outer electrodes containing metal powder, a resin and a solvent are produced, and these pastes are used to form the outer electrodes 7 and 8. Next, a baking step for removing the solvent and a plating treatment for protecting and mounting the surfaces of the outer electrodes 7 and 8 are carried out. In the sputtering method, since protective layers or layers for mounting on the outer electrodes 7 and 8 can be formed, the baking step and the plating treatment step become unnecessary.

The all-solid-state battery 1 can be manufactured by carrying out steps as described above.

The present invention is not always limited only to the above-described embodiment, and a variety of modifications can be added within the scope of the gist of the present invention. That is, the individual configurations in the embodiment, a combination thereof, and the like are simply examples, and the addition, omission, substitution, and other modifications of the configuration can be added within the scope of the gist of the present invention.

EXAMPLES

Hereinafter, the present invention will be further described in more detail using examples and comparative examples based on the above-described embodiment, but the present invention is not limited to these examples. "Parts" indicating the amounts of materials prepared in the production of pastes means "parts by mass" unless particularly otherwise described.

Example 1

(Production of Positive Electrode Active Material and Negative Electrode Active Material)

As a positive electrode active material and a negative electrode active material, $Li_3V_2(PO_4)_3$ produced by the following method was used. As the production method, $Li_2CO_3$, $V_2O_5$ and $NH_4H_2PO_4$ were used as starting materials, mixed in a wet manner in a ball mill for 16 hours, dehydrated and dried to obtain powder. The powder was calcined in a nitrogen/hydrogen gas mixture at 850° C. for two hours. The calcined product was ground in a wet manner with the ball mill, then, dehydrated and dried to obtain positive electrode active material powder and negative electrode active material powder. The fact that the compositions of these produced powders were $Li_3V_2(PO_4)_3$ was confirmed using an ICP emission spectroscopic analysis and an X-ray diffraction device (XRD).

(Production of Paste for Positive Electrode Active Material Layer and Paste for Negative Electrode Active Material Layer)

As a paste for a positive electrode active material layer and a paste for a negative electrode active material layer, ethyl cellulose (15 parts) as a binder and dihydroterpineol (150 parts) as a solvent were added to $Li_3V_2(PO_4)_3$ powder (100 parts), mixed and dispersed, thereby producing a paste for a positive electrode active material layer and a paste for a negative electrode active material layer.

(Production of Paste for Solid Electrolyte Layer)

As a solid electrolyte, $Li_{1.3}Al_{0.3}Ti_{1.7}(PO_4)_3$ produced by the following method was used. In the production method, $Li_2CO_3$, $Al_2O_3$, $TiO_2$ and $NH_4H_2PO_4$ were used as starting materials, mixed in a wet manner in the ball mill for 16 hours, then, dehydrated and dried. Next, the obtained powder was calcined in the atmosphere at 800° C. for two hours. After the calcination, the powder was ground in a wet manner with the ball mill for 16 hours, then, dehydrated and dried to obtain solid electrolyte powder. The fact that the produced powder was a crystal phase of $Li_{1.3}Al_{0.3}Ti_{1.7}(PO_4)_3$ was confirmed using ICP and the X-ray diffraction device (XRD).

Next, carbon black powder was mechanically dispersed (dispersed with a machine) in an equivalent of 1000 ppm (approximately 0.1 parts) with respect to 100 parts of this solid electrolyte powder. As a disperser, NOBILTA NOB-130 manufactured by Hosokawa Micron Co., Ltd. was used, and the dispersion state was adjusted with the rotation speed of the rotor and the treatment time. The rotation speed of the rotor can be increased up to a maximum of 6000 rpm, but conditions under which the dispersion state was most favorable were explored by observation with a SEM, and the treatment was carried out at 3000 rpm for 15 minutes.

Next, ethanol (100 parts) and toluene (50 parts) were added as solvents to the solid electrolyte powder (100 parts) and the carbon black powder (an equivalent of 1000 ppm) that had been mechanically dispersed, and a polyvinyl butyral-based binder (16 parts) and bis(2-ethylhexyl) phthalate (4.8 parts) were injected thereinto and mixed in a wet manner with the ball mill for 16 hours as secondary dispersion, thereby producing a paste for a solid electrolyte layer.

The specific gravity of the solid electrolyte $Li_{1.3}Al_{0.3}Ti_{1.7}(PO_4)_3$ is 2.93, and the specific gravity of the carbon black is 1.8. When the abundance percentage of carbon in the entire powder is obtained in terms of volume, the amount of carbon becomes 0.16 vol %. Here, the volume converted from the amount (vol %) of carbon based on the specific gravity was obtained from {(the amount (wt %) of carbon in the solid electrolyte layer)/the specific gravity (g/cm$^3$) of carbon}/{(the amount (wt %) of carbon in the solid electrolyte layer)/the specific gravity (g/cm$^3$) of carbon}+{(the amount (wt %) of the solid electrolyte in the solid electrolyte layer)/the specific gravity (g/cm³) of the solid electrolyte}. The amount of carbon (wt %) in the solid electrolyte layer was obtained by a method to be described below, in which an EPMA was used. The mass (wt %) of the solid electrolyte in the solid electrolyte layer is a value obtained by subtracting the amount (wt %) of carbon in the solid electrolyte layer from 100%.

(Production of Sheet for Solid Electrolyte Layer)

The paste for a solid electrolyte layer was formed into a sheet on a PET film, which was a base material, by the doctor blade method, and a 15 μm-thick sheet for a solid electrolyte layer was obtained.

(Production of Paste for Positive Electrode Current Collector Layer and Paste for Negative Electrode Current Collector Layer)

As a positive electrode current collector and a negative electrode current collector, Cu and $Li_3V_2(PO_4)_3$ were mixed together such that the volume ratio reached 80/20, and ethyl cellulose (10 parts) as a binder and dihydroterpineol (50 parts) as a solvent were added thereto, mixed and dispersed, thereby producing a paste for a positive electrode current collector layer and a paste for a negative electrode current collector layer.

(Production of Paste for Margin Layer)

Regarding the powder of a paste for a margin layer, similar to the powder for the solid electrolyte layer, carbon black powder was mechanically dispersed in an equivalent of 1000 ppm (approximately 0.1 parts) with respect to 100 parts of $Li_{1.3}Al_{0.3}Ti_{1.7}(PO_4)_3$ powder, and then dihydroterpineol (150 parts) as a solvent and ethyl cellulose (15 parts) as a binder were added thereto, mixed and dispersed, thereby producing a paste for a margin layer.

(Production of Outer Electrode Pastes)

Silver powder, an epoxy resin and a solvent were mixed and dispersed, thereby producing thermoset-type outer electrode pastes.

An all-solid-state battery was produced as described below using these pastes.

(Production of Positive Electrode Layer Unit)

A 5 μm-thick positive electrode active material layer (referred to as the first positive electrode active material layer) was formed on the produced sheet for a solid electrolyte layer using screen printing and dried at 80° C. for 10 minutes. Next, a 5 μm-thick positive electrode current collector layer was formed on the positive electrode active material layer using screen printing and dried at 80° C. for 10 minutes. Furthermore, a 5 μm-thick positive electrode active material layer (referred to as the second positive electrode active material layer) was formed again on the positive electrode current collector layer using screen printing and dried at 80° C. for 10 minutes, thereby producing a positive electrode layer on the sheet for a solid electrolyte layer. Next, a margin layer substantially as thick as the positive electrode layer was formed at the outer circumference of the positive electrode layer at one end by screen printing and dried at 80° C. for 10 minutes. Next, the PET film was peeled off, thereby obtaining a sheet of a positive electrode layer unit.

(Production of Negative Electrode Layer Unit)

A 5 μm-thick negative electrode active material layer (referred to as the first negative electrode active material layer) was formed on the produced sheet for a solid electrolyte layer using screen printing and dried at 80° C. for 10 minutes. Next, a 5 μm-thick negative electrode current collector layer was formed on the negative electrode active material layer using screen printing and dried at 80° C. for 10 minutes. Furthermore, a 5 μm-thick negative electrode active material layer (referred to as the second negative electrode active material layer) was formed again on the negative electrode current collector layer using screen printing and dried at 80° C. for 10 minutes, thereby producing a negative electrode layer on the sheet for a solid electrolyte layer. Next, a margin layer substantially as thick as the negative electrode layer was formed at the outer circumference of the negative electrode layer at one end by screen printing and dried at 80° C. for 10 minutes. Next, the PET film was peeled off, thereby obtaining a sheet of a negative electrode layer unit.

(Production of Laminate)

A plurality of the positive electrode layer units and a plurality of the negative electrode layer units were alternately laminated to be offset such that one end of the positive electrode layer unit did not match one end of the negative electrode layer unit, thereby producing a laminate substrate. Furthermore, a plurality of the same sheets as the solid electrolyte layer sheet containing carbon was laminated as external layers on both main surfaces of the laminate substrate to provide 500 μm-thick external layers. This laminate substrate was pressed by warm isotropic pressing (WIP) at 80° C. and 1 ton and then cut to produce an unfired laminate.

(Firing of Laminate)

The binder was removed from the cut laminate, and the cut laminate was fired, thereby obtaining a fired body. The binder was removed by heating the laminate up to 500° C. at a heating rate of 50° C./hour in a nitrogen atmosphere and holding the laminate at the temperature for two hours. Subsequently, as firing, the laminate was heated up to 800° C. at a heating rate of 200° C./hour in a nitrogen atmosphere, held at the temperature for two hours, naturally cooled and then removed.

(Outer Electrode Formation Step)

The outer electrode pastes were applied to end faces of the fired laminate and thermally cured at 150° C. for 30 minutes, thereby forming a pair of outer electrodes. A chip-shaped all-solid-state battery was completed as described above.

In the all-solid-state battery produced by the present example, the amount of carbon contained in the solid electrolyte layer can be measured as described below.

First, the all-solid-state battery is polished in a state of being embedded in a resin such as an epoxy resin, and a cross section of the solid electrolyte layer is exposed. At this time, the all-solid-state battery is preferably polished not perpendicularly to the lamination direction but at a small angle to the horizontal for measuring an extremely wide area. Next, the concentration of carbon is measured with an EPMA (WDS=wavelength dispersive spectroscopy). As the measurement conditions, the acceleration voltage is set to 10 kV, the measurement current is set to 500 nA, the peak measurement time is set to 80 seconds, the background measurement time is set to 20 seconds, and the spot diameter is set to the minimum. A liquid nitrogen trap is desirably used in the measurement in order to eliminate the influence of a measurement error caused by hydrocarbon contamination in the device.

In addition, similar to what has described above, the all-solid-state battery is polished almost perpendicularly to the lamination direction of the solid electrolyte layer in a state of being embedded in a resin such as an epoxy resin, and a cross section of the solid electrolyte layer is exposed. In addition, a SEM image of the exposed cross section of the solid electrolyte layer is acquired, and the dispersion degree (CV value) is calculated by the above-described image processing and calculation method.

Examples 2 to 5

As all-solid-state batteries according to Examples 2 to 5, all-solid-state batteries were produced in the same manner as in Example 1 except that the conditions for the mechanical dispersion in the production of the paste for a solid electrolyte layer were changed.

Comparative Example 1

As an all-solid-state battery according to Comparative Example 1, an all-solid-state battery was produced in the same manner as in Example 1 except that carbon black was not added to the paste for a solid electrolyte layer. In order to eliminate the influence of a stress or the like during the mechanical dispersion, the solid electrolyte powder alone was treated under the same conditions as in Example 1.

Comparative Example 2

As an all-solid-state battery according to Comparative Example 2, an all-solid-state battery was produced in the same manner as in Example 1 except that, as the condition for the mechanical dispersion in the production of the paste for a solid electrolyte layer, the rotation speed of the rotor was set to 6000 rpm. When the powder after the mechanical dispersion was observed with a SEM, it was confirmed that, in a case where the rotation speed was excessively increased, the solid electrolyte powder particles fused to each other and the dispersion state of the solid electrolyte powder with carbon deteriorated.

Conditions for the mechanical dispersion in Examples 1 to 5 and Comparative Examples 1 and 2 are shown in Table 3.

TABLE 3

| | Rotation speed of motor (rpm) | Treatment time (min) |
|---|---|---|
| Example 1 | 3000 | 15 |
| Example 2 | 3000 | 10 |
| Example 3 | 3000 | 5 |
| Example 4 | 2000 | 3 |
| Example 5 | 1000 | 5 |
| Comparative Example 1 | 3000 | 15 |
| Comparative Example 2 | 6000 | 15 |

Examples 6 to 15

As all-solid-state batteries according to Examples 6 to 15, all-solid-state batteries were produced in the same manner as in Example 1 except that the amount of carbon black powder added was set to an equivalent of 30 to 15,000 ppm. When the abundance percentage of carbon in the entire powder is obtained in terms of volume, the amount of carbon becomes 0.00 to 1.8 vol %.

Example 16

A laminate of an all-solid-state battery was produced without adding carbon black to the paste for a solid electrolyte layer as in Comparative Example 1. In addition, the binder was removed by heating the laminate up to 350° C. at a heating rate of 50° C./hour in a nitrogen atmosphere and holding the laminate at the temperature for two hours. Subsequently, as firing, the laminate was heated up to 800° C. at a heating rate of 200° C./hour in a nitrogen atmosphere, held at the temperature for two hours, naturally cooled and then removed. An all-solid-state battery was produced by carrying out the subsequent steps in the same manner as in Example 1.

Examples 17 to 21

All-solid-state batteries were produced in the same manner as in Example 1 except that the solid electrolyte was changed to $Li_{3.6}Si_{0.6}P_{0.4}O_4$ and the amount of carbon black powder added was set to an equivalent of 30 to 15,000 ppm. The specific gravity of $Li_{3.6}Si_{0.6}P_{0.4}O_4$ is 2.40 (g/cm$^3$), and, when the abundance percentage of carbon in the entire powder is obtained in terms of volume, the amount of carbon becomes 0.00 to 2.0 vol %.

Example 22

An all-solid-state battery was produced in the same manner as in Example 1 except that the solid electrolyte was changed to $LiZr_2(PO_4)_3$. The specific gravity of $LiZr_2(PO_4)_3$ is 3.17 (g/cm$^3$), and, when the abundance percentage of carbon in the entire powder is obtained in terms of volume, the amount of carbon becomes 0.18 vol %.

Example 23

An all-solid-state battery was produced in the same manner as in Example 1 except that the solid electrolyte was changed to $Li_{0.34}La_{0.51}TiO_3$. The specific gravity of $Li_{0.34}La_{0.51}TiO_3$ is 5.00 (g/cm$^3$), and, when the abundance percentage of carbon in the entire powder is obtained in terms of volume, the amount of carbon becomes 0.28 vol %.

Examples 24 to 28

All-solid-state batteries were produced in the same manner as in Example 1 except that the solid electrolyte was changed to $Li_7La_3Zr_2O_2$ and the amount of carbon black powder added was set to an equivalent of 30 to 10,000 ppm. The specific gravity of $Li_7La_3Zr_2O_{12}$ is 5.11 (g/cm$^3$), and, when the abundance percentage of carbon in the entire powder is obtained in terms of volume, the amount of carbon becomes 0.01 to 2.8 vol %.

Examples 29 to 34

As all-solid-state batteries according to Examples 29 to 34, all-solid-state batteries were produced in the same manner as in Example 1 except that the kind of carbon added in the production of the paste for a solid electrolyte layer was changed. That is, in Examples 29 to 34, carbon black was not added, and other carbons were added. The specific gravities of carbon are 3.52 (g/cm$^3$) for diamond, 2.23 (g/cm$^3$) for scaly graphite, 1.8 (g/cm$^3$) for acetylene black and furnace black, which is the same as in Example 1, and 2.2 (g/cm$^3$) for amorphous graphite and spheroidal graphite, which is the same as that of the scaly graphite, and, when converted into volume, the amount of carbon becomes 0.08 to 0.16 vol %.

(Battery Evaluation)

The all-solid-state batteries produced in the present examples and comparative examples can be evaluated regarding the following battery characteristics.

[Calculation of Design Capacity]

The design capacity is obtained in advance. In order to obtain the design capacity, first, the solid electrolyte powder is pressed with, for example, a mold having a diameter of 12 mm to produce a compact having a thickness of approximately 1.5 mm, the binder is removed from this compact, and the compact is fired, thereby obtaining a disk-shaped fired body. Regarding the conditions for the binder removal, in order to extract the same battery characteristics as the battery characteristics of the chip-shaped all-solid-state battery, the atmosphere, the temperature and the like are set to the same conditions. After the thickness of the disc-shaped fired body is measured, the outer electrode pastes are applied to, for example, diameters of 7 mm and thermally cured. In addition, the charge and discharge characteristics of this disk-shaped solid electrolyte are measured, and the discharge capacity per unit volume is obtained. The discharge capacity value of the chip-shaped all-solid-state battery is calculated from this discharge capacity per unit volume and regarded as the "design capacity". As long as the discharge capacity per unit volume can be obtained, the shape in the main measurement or the shape of the outer electrode is not particularly limited.

[Initial Charge and Discharge Test]

The all-solid-state batteries produced in the present examples and the comparative examples can be evaluated with, for example, charging and discharging conditions to be described below. As the notation of the charge and discharge current, C rate notations will be used below. The C rate is expressed as nC (μA) (n is a numerical value) and means a current with which the nominal capacity (μAh) can be charged and discharged within 1/n (h). For example, 1 C means a charge and discharge current with which the nominal capacity can be charged within 1 h, and 2 C means a charge and discharge current with which the nominal capacity can be charged within 0.5 h. For example, in the case of an all-solid-state battery having a nominal capacity of 100 μAh, a current of 0.1 C is 10 μA (calculation expression: 100 μA×0.1=10 μA). Similarly, a current of 0.2 C is 20 μA, and a current of 1 C is 100 μA.

The obtained design capacity was regarded as the nominal capacity, the all-solid-state battery was constant-current-charged (CC charging) at a constant current of 0.2 C rate until a battery voltage of 1.8 V was reached and then discharged at a constant current of 0.2 C rate (CC discharging) until a battery voltage of 0 V was reached, and the initial discharge capacity was measured. In addition, the percentage with respect to the design capacity was obtained by the following expression (1).

Initial discharge capacity rate(%)=(initial discharge capacity÷design capacity)×100 (1)

[Charge and Discharge Cycle Test]

As the conditions for a charge and discharge cycle test, the all-solid-state battery was constant-current-charged (CC charging) in an environment of 25° C. at a constant current of 0.2 C rate until a battery voltage of 1.8 V was reached and then discharged at a constant current of 0.2 C rate (CC discharging) until a battery voltage of 0 V was reached. The above-described charging and discharging were defined as one cycle, and the discharge capacity retention rate after repeating 100 cycles of charging and discharging was evaluated as the charge and discharge cycle characteristic. The charge and discharge cycle characteristic in the present embodiment is calculated by the following calculation expression.

Discharge capacity rate (%) after 100 cycles=(discharge capacity after 100 cycles÷initial discharge capacity)×100 (2)

(Results)

Table 4 shows the specific gravities of the materials, the amounts of carbon (weight ppm), the specific gravities of carbon, the amounts of carbon (vol %) and the dispersion degrees of carbon in the solid electrolyte layers according to Examples 1 to 5 and Comparative Examples 1 and 2 and the results of the initial internal short circuit occurrence rates, the initial discharge capacity rates with respect to the design capacity and the discharge capacity rates after 100 cycles with respect to the design capacity of the all-solid-state batteries for which the solid electrolyte layers were used. Here, as the amounts of the carbon (weight ppm) in the solid electrolyte layers, actual amounts measured using the EPMA are shown in the table. Ten thousand weight ppm is equal to 1 wt %. Regarding the amounts of carbon (vol %) in the solid electrolyte layers, the weights blended (ppm) and values calculated from the weight blended and the specific gravity in the unit of "vol %" are shown in the table. That is, the amounts of carbon (vol %) in the solid electrolyte layers were obtained by volume conversion based on the specific gravity.

TABLE 4

| | Composition of solid electrolyte material | Specific gravity of solid electrolyte (g/cm³) | Amount of carbon in solid electrolyte layer (ppm) | Specific gravity of carbon (g/cm³) | Amount of carbon in solid electrolyte layer (vol %) | Dispersion degree of carbon in solid electrolyte layer | internal short circuit occurrence rate (%) | Initial discharge capacity rate (%) | Discharge capacity rate after 100 cycles (%) |
|---|---|---|---|---|---|---|---|---|---|
| Example 1 | $Li_{1.3}Al_{0.3}Ti_{1.7}(PO_4)_3$ | 2.93 | 1000 | 1.8 | 0.16 | 0.1 | 1 | 100 | 95 |
| Example 2 | $Li_{1.3}Al_{0.3}Ti_{1.7}(PO_4)_3$ | 2.93 | 1000 | 1.8 | 0.16 | 0.2 | 1 | 100 | 93 |
| Example 3 | $Li_{1.3}Al_{0.3}Ti_{1.7}(PO_4)_3$ | 2.93 | 1000 | 1 8 | 0.16 | 0.3 | 3 | 100 | 90 |
| Example 4 | $Li_{1.3}Al_{0.3}Ti_{1.7}(PO_4)_3$ | 2.93 | 1000 | 1.8 | 0.16 | 0.5 | 5 | 98 | 83 |
| Example 5 | $Li_{1.3}Al_{0.3}Ti_{1.7}(PO_4)_3$ | 2.93 | 1000 | 1.8 | 0.16 | 0.8 | 10 | 90 | 75 |
| Comparative Example 1 | $Li_{1.3}Al_{0.3}Ti_{1.7}(PO_4)_3$ | 2.93 | 0 | 1 8 | 0.00 | 0.0 | 0 | 80 | 65 |
| Comparative Example 2 | $Li_{1.3}Al_{0.3}Ti_{1.7}(PO_4)_3$ | 2.93 | 1000 | 1.8 | 0.16 | 1.0 | 20 | 83 | 68 |

In the all-solid-state batteries according to Examples 1 to 5, it was confirmed that the occurrence rates of an initial internal short circuit were maintained low, at the same time, the initial discharge capacity rates were as high as 90% or more, the discharge capacity rates after 100 cycles were also maintained at 75% or more and excellent. This is because the presence of carbon having favorable dispersibility exhibits an effect on increasing the strengths of the solid electrolyte layers while suppressing an internal short circuit.

In Comparative Example 1 where carbon was not contained, an initial internal short circuit did not occur, but the initial discharge capacity rate and the discharge capacity rate after 100 cycles significantly decreased. As a result of embedding and polishing the all-solid-state battery of Comparative Example 1 in an epoxy resin after 100 cycles and observing a cross section of the solid electrolyte layer, cracks were observed. This is because the solid electrolyte layer was not capable of withstanding an expansion and shrinkage stress associated with charging and discharging, cracks were initiated, and consequently, the capacity decreased.

On the other hand, in Comparative Example 2 where the same amount of carbon was contained, but the dispersion degree was poor, the occurrence rate of an initial internal short circuit was high. It is assumed that carbon that was locally present in a large amount formed a conductive path. In addition, there was a tendency for the discharge capacity rate after 100 cycles to decrease. This is because carbon was not evenly present and thus the effect on increasing the strength of the solid electrolyte layer was not sufficiently exhibited in a portion where a small amount of carbon was present.

Table 5 and Table 6 show the specific gravities of the solid electrolyte materials, the amounts of carbon and the dispersion degrees of carbon in the solid electrolyte layers according to Examples 6 to 28 and the results of the internal short circuit occurrence rates after the initial charging and discharging, the initial discharge capacity rates with respect to the design capacity and the discharge capacity rates after 100 cycles with respect to the design capacity of the all-solid-state batteries for which the solid electrolyte layers were used.

In Examples 6 to 15, the all-solid-state batteries were produced under the same conditions as in Example 1 except that the amounts of carbon black powder added were changed. In Example 6, the amount of carbon was 30 ppm, the converted volume was 0.00 vol %, and the initial discharge capacity was 79%. Compared with Example 6, in Example 1, the amount of carbon was sufficiently large, and the effect on improving the strength of the solid electrolyte layer was highly obtained.

On the other hand, in Examples 14, 15 and 21, the amount of carbon exceeds 11000 ppm and the converted volume exceeded 1.8%. However, an effect on suppressing the occurrence rate of an internal short circuit was obtained by improving the dispersion degree of carbon compared with the dispersion degree of carbon in Comparative Example 2. In Examples 1 to 13, 16 to 20 and 22 to 27, the amounts of carbon were 11000 ppm, the converted volumes were 1.8% or less, and the occurrence rates of an internal short circuit were 10% or less. It is considered that, when the amount of carbon is set to be small, a conductive path is less likely to be formed while maintaining the degrees of dispersion. In addition, when the amount of carbon is set to be small, it becomes easy for the sintering densities to increase, and the initial discharge capacity rate improves.

Example 16 was an all-solid-state battery for which the carbon powder was not added and the temperature at the time of removing the binder was decreased to leave the binder intentionally. Since the amount of carbon was ana-

TABLE 5

| | Composition of solid, electrolyte material | Specific gravity of solid electrolyte (g/cm3) | Amount of carbon in solid electrolyte layer (ppm) | Specific gravity of carbon (g/cm³) | Amount of carbon in solid electrolyte layer (vol %) | Dispersion degree of carbon in solid electrolyte layer | Internal short circuit occurrence rate (%) | Initial discharge capacity rate (%) | Discharge capacity rate after 100 cycles (%) |
|---|---|---|---|---|---|---|---|---|---|
| Example 6 | $Li_{1.3}Al_{0.3}Ti_{1.7}(PO_4)_3$ | 2.93 | 30 | 1.8 | 0.00 | 0.1 | 0 | 79 | 72 |
| Example 7 | $Li_{1.3}Al_{0.3}Ti_{1.7}(PO_4)_3$ | 2.93 | 40 | 1.8 | 0.01 | 0.1 | 1 | 86 | 80 |
| Example 8 | $Li_{1.3}Al_{0.3}Ti_{1.7}(PO_4)_3$ | 2.93 | 50 | 1.8 | 0.01 | 0.1 | 2 | 95 | 85 |
| Example 9 | $Li_{1.3}Al_{0.3}Ti_{1.7}(PO_4)_3$ | 2.93 | 100 | 1.8 | 0.02 | 0.1 | 1 | 100 | 96 |
| Example 10 | $Li_{1.3}Al_{0.3}Ti_{1.7}(PO_4)_3$ | 2.93 | 500 | 1.8 | 0.08 | 0.1 | 3 | 100 | 95 |
| Example 11 | $Li_{1.3}Al_{0.3}Ti_{1.7}(PO_4)_3$ | 2.93 | 5000 | 1.8 | 0.81 | 0.1 | 5 | 98 | 87 |
| Example 12 | $Li_{1.3}Al_{0.3}Ti_{1.7}(PO_4)_3$ | 2.93 | 10000 | 1.8 | 1.6 | 0.1 | 8 | 92 | 80 |
| Example 13 | $Li_{1.3}Al_{0.3}Ti_{1.7}(PO_4)_3$ | 2.93 | 11000 | 1.8 | 1.8 | 0.1 | 8 | 90 | 81 |
| Example 14 | $Li_{1.3}Al_{0.3}Ti_{1.7}(PO_4)_3$ | 2.93 | 12000 | 1.8 | 1.9 | 0 1 | 12 | 89 | 77 |
| Example 15 | $Li_{1.3}Al_{0.3}Ti_{1.7}(PO_4)_3$ | 2.93 | 15000 | 1.8 | 2.4 | 0.1 | 15 | 85 | 70 |
| Example 16 | $Li_{1.3}Al_{0.3}Ti_{1.7}(PO_4)_3$ | 2.93 | 1200 | 1.8 | 0.20 | 0.14 | 5 | 99 | 95 |

TABLE 6

| | Composition of solid electrolyte material | Specific gravity of solid electrolyte (g/cm³) | Amount of carbon in solid electrolyte layer (ppm) | Specific gravity of carbon (g/cm³) | Amount of carbon in solid electrolyte layer (vol %) | Dispersion degree of carbon in solid electrolyte layer | Internal short circuit occurrence rate (%) | Initial discharge capacity rate (%) | Discharge capacity rate after 100 cycles (%) |
|---|---|---|---|---|---|---|---|---|---|
| Example 17 | $Li_{3.6}Si_{0.6}P_{0.4}O_4$ | 2.40 | 30 | 1.8 | 0.00 | 0.1 | 3 | 85 | 76 |
| Example 18 | $Li_{3.6}Si_{0.6}P_{0.4}O_4$ | 2.40 | 100 | 1.8 | 0.01 | 0.1 | 1 | 95 | 92 |
| Example 19 | $Li_{3.6}Si_{0.6}P_{0.4}O_4$ | 2.40 | 1000 | 1.8 | 0.13 | 0.1 | 0 | 93 | 89 |
| Example 20 | $Li_{3.6}Si_{0.6}P_{0.4}O_4$ | 2.40 | 12000 | 1.8 | 1.6 | 0.1 | 7 | 88 | 82 |
| Example 21 | $Li_{3.6}Si_{0.6}P_{0.4}O_4$ | 2.40 | 15000 | 1.8 | 2.0 | 0.1 | 11 | 84 | 74 |
| Example 22 | $Li_{3.6}Si_{0.6}P_{0.4}O_4$ | 3.17 | 1000 | 1.8 | 0.18 | 0.1 | 1 | 98 | 92 |
| Example 23 | $Li_{3.6}Si_{0.6}P_{0.4}O_4$ | 5.00 | 1000 | 1.8 | 0.28 | 0.1 | 2 | 95 | 90 |
| Example 24 | $Li_{3.6}Si_{0.6}P_{0.4}O_4$ | 5.11 | 30 | 1.8 | 0.01 | 0 1 | 2 | 84 | 80 |
| Example 25 | $Li_{3.6}Si_{0.6}P_{0.4}O_4$ | 5.11 | 100 | 1.8 | 0.03 | 0.1 | 2 | 90 | 84 |
| Example 26 | $Li_{3.6}Si_{0.6}P_{0.4}O_4$ | 5.11 | 1000 | 1.8 | 0.28 | 0.1 | 1 | 94 | 82 |
| Example 27 | $Li_{3.6}Si_{0.6}P_{0.4}O_4$ | 5.11 | 5000 | 1.8 | 1.4 | 0.1 | 6 | 91 | 79 |
| Example 28 | $Li_{3.6}Si_{0.6}P_{0.4}O_4$ | 5.11 | 10000 | 1.8 | 2.8 | 0.1 | 17 | 82 | 71 | lyzed to be 1200 ppm and the carbon is assumed to be amorphous carbon, the converted volume calculated from the specific gravity of 1.8 was 0.20 vol %, and the degree of dispersion of carbon was 0.13, which were similar to those of Example 1. The characteristics remained favorable after initial discharging and after 100 cycles, and it is found that carbon may be the added carbon or a residue derived from the binder.

In Examples 17 to 28, the all-solid-state batteries were produced under the same conditions as in Example 1 except that the kinds of the solid electrolyte were changed and, furthermore, similar to Examples 6 to 15, the amounts of carbon black powder added were changed. In these examples, strong effects could be obtained compared with the comparative examples. In Examples 17 to 21, since the solid electrolytes having a lower specific gravity than those in Examples 6 to 15 were used, in a case where the same weight of carbon was added, the volume ratios of carbon relatively shifted to be low. When the same weight (12000 ppm) of carbon was added, while the amount of carbon reached 1.9 vol % and the initial internal short circuit attributed to insufficient firing was more than 10% in Example 14, the amount of carbon remained at 1.6 vol % and the initial internal short circuit was maintained at a low level of less than 10% in Example 20. That is, it is found that the effect of carbon being exhibited is affected not by the weight ratio but by the volume ratio.

In Examples 24 to 28, the all-solid-state batteries were produced under the same conditions as in Example 1 except that the kinds of the solid electrolytes were changed and, furthermore, similar to Examples 6 to 15, the amounts of carbon black powder added were changed. In these examples, strong effects could be obtained compared with the comparative examples. In Examples 24 to 28, since the solid electrolytes having a higher specific gravity than those in Examples 6 to 15 were used, in a case where the same weight of carbon was added, the volume ratios of carbon relatively shifted to be high. When the same weight (10000 ppm) of carbon was added, the amount of carbon was 1.6 vol %, the initial short circuit was as small as less than 10%, and 80% of the capacity was maintained after 100 cycles in Example 12. In Example 28, the amount of carbon reached 2.8 vol %, the firing became insufficient, the initial internal short circuit was more than 10%, and the capacity after 100 cycles was 71%. From these indexes, a strong effect can be confirmed compared with the comparative examples. Even here, it is found that the effect of carbon being exhibited is affected not by the weight ratio but by the volume ratio.

Examples 6 to 28 show that the amount of carbon present in the solid electrolyte layer is preferably 0.01% to 1.8% in terms of volume.

Table 7 shows the IG/ID (graphitization degree) of carbon measured by Raman spectroscopy, the amounts of carbon and the dispersion degrees of carbon in the solid electrolyte layers according to Examples 29 to 34 and the results of the discharge capacity rates after initial charging and discharging with respect to the design capacity and the discharge capacity rates after 100 cycles with respect to the design capacity of the all-solid-state batteries for which the solid electrolyte layers were used.

TABLE 7

| | Composition of solid electrolyte material | Specific gravity of solid electrolyte ($g/cm^3$) | Carbon added | Specific gravity of carbon ($g/cm^3$) | IG/ID | Amount of carbon in solid electrolyte layer (ppm) | Amount of carbon in solid electrolyte layer (vol %) | Dispersion degree of carbon in solid electrolyte layer | initial discharge capacity rate (%) | Discharge capacity rate after 100 cycles (%) |
|---|---|---|---|---|---|---|---|---|---|---|
| Example 29 | $Li_{1.3}Al_{0.3}Ti_{1.7}(PO_4)_3$ | 2.93 | Diamond | 3.52 | 0.0 | 1000 | 0.08 | 0.1 | 100 | 97 |
| Example 30 | $Li_{1.3}Al_{0.3}Ti_{1.7}(PO_4)_3$ | 2.93 | Acetylene black | 1.8 | 0.9 | 1000 | 0.16 | 0.1 | 100 | 94 |
| Example 31 | $Li_{1.3}Al_{0.3}Ti_{1.7}(PO_4)_3$ | 2.93 | Furnace black | 1.8 | 2.0 | 1000 | 0.16 | 0.1 | 100 | 95 |
| Example 32 | $Li_{1.3}Al_{0.3}Ti_{1.7}(PO_4)_3$ | 2.93 | Amorphous graphite | 2 2 | 4.0 | 1000 | 0.13 | 0.1 | 95 | 82 |
| Example 33 | $Li_{1.3}Al_{0.3}Ti_{1.7}(PO_4)_3$ | 2.93 | Spherical graphite | 2.2 | 4.2 | 1000 | 0.13 | 0.1 | 90 | 75 |
| Example 34 | $Li_{1.3}Al_{0.3}Ti_{1.7}(PO_4)_3$ | 2.93 | Scaly graphite | 2.23 | 6.6 | 1000 | 0.13 | 0.1 | 86 | 72 |

In Examples 29 to 34, the all-solid-state batteries were produced by adding a variety of carbon powders having different shapes that were produced by different methods. Even in Examples 29 to 34, a strong effect can be obtained compared with the comparative examples. For these examples, cross sections of the solid electrolyte layers were analyzed by Raman spectroscopy and the relationships between the graphitization degree (IG/ID value) of carbon and the characteristics were found. As a result, it was confirmed that, for diamond or amorphous carbon, which had a low graphitization degree of 0 to 4.0, the characteristics were particularly excellent even after the initial discharging and after 100 cycles. Since the mechanical strengths of these carbons are high, it is considered that, when these carbons are contained, the effect on increasing the strength of the solid electrolyte layer is strong. On the other hand, in Examples 32, 33 and the like where carbons having a graphitization degree of more than 4 became crystalline graphite, and the effect on increasing the strength of the solid electrolyte layer was weak compared with those in Examples 29 to 31.

Hitherto, the present invention has been described in detail, but the embodiment and the examples are merely examples. The present invention includes a variety of modifications and changes of the above-described specific examples within the scope of the gist described in the claims.

REFERENCE SIGNS LIST

1 All-solid-state battery
2 Solid electrolyte layer
3 Positive electrode layer
3a Positive electrode active material layer 3b Positive electrode current collector layer
4 Negative electrode layer
4a Negative electrode active material layer
4b Negative electrode current collector layer
5 Margin layer
6 External layer
7 Outer positive electrode (outer electrode)
8 Outer negative electrode (outer electrode)

What is claimed is:

1. A solid electrolyte layer comprising:
a solid electrolyte; and
carbon,
wherein, in a cross section of the solid electrolyte layer, a dispersion degree (CV value) of the carbon measured by a quadrat method is more than zero and less than one, and
wherein an amount of the carbon in the solid electrolyte layer is 0.01 to 1.8 vol %.

2. The solid electrolyte layer according to claim 1, wherein, in an argon laser Raman spectrum, when an intensity of a G band peak derived from a graphite structure present near 1580 cm$^{-1}$ is represented by IG, an intensity of a D band peak derived from distortion of the graphite structure present near 1350 cm$^{-1}$ is represented by ID, and a ratio therebetween is defined as a graphitization degree (IG/ID), an IG/ID value of the carbon is 0.0 or more and 4.0 or less.

3. The solid electrolyte layer according to claim 1, wherein an average particle diameter of the carbon particles is 0.01 μm or more and 1 μm or less.

4. The solid electrolyte layer according to claim 1, wherein the carbon particles are diamond or amorphous carbon particles.

5. The solid electrolyte layer according to claim 1, wherein the amount of the carbon in the solid electrolyte layer is 0.02 to 0.80 vol %.

6. The solid electrolyte layer according to claim 1, wherein the amount of the carbon in the solid electrolyte layer is equal to 0.05 to 1.8 vol %.

7. An all-solid-state battery comprising:
the solid electrolyte layer according to claim 1.

8. The all-solid-state battery according to claim 7, comprising:
a positive electrode layer;
a negative electrode layer;
the solid electrolyte layer positioned between the positive electrode layer and the negative electrode layer; and
a margin layer disposed at an outer circumference of each of the positive electrode layer and the negative electrode layer side by side,
wherein the margin layer has a solid electrolyte and carbon, and
a dispersion degree (CV value) of the carbon measured by a quadrat method in a cross section of the margin layer is more than zero and less than one.

* * * * *